Feb. 9, 1954  K. A. FISCHER  2,668,470
METHOD AND APPARATUS FOR ELECTROOPTICAL ANALYSIS
OF THE CRYSTALLINE CONTENT OF LIQUIDS
Filed May 13, 1948  2 Sheets-Sheet 1
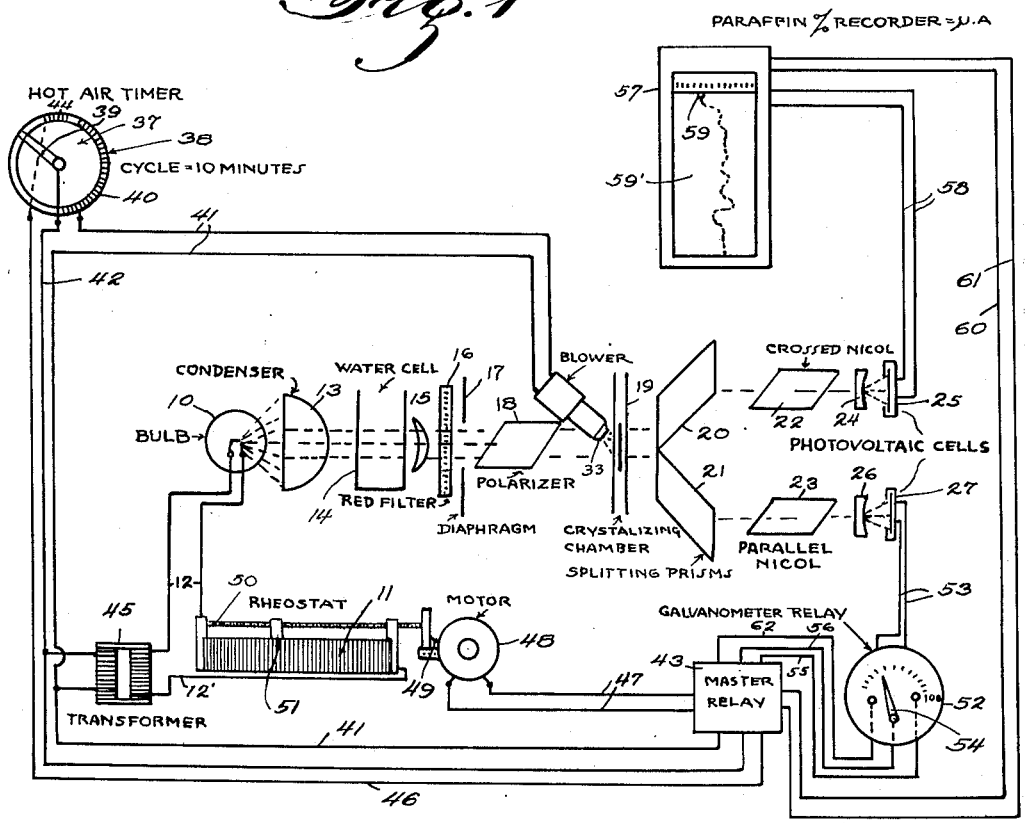
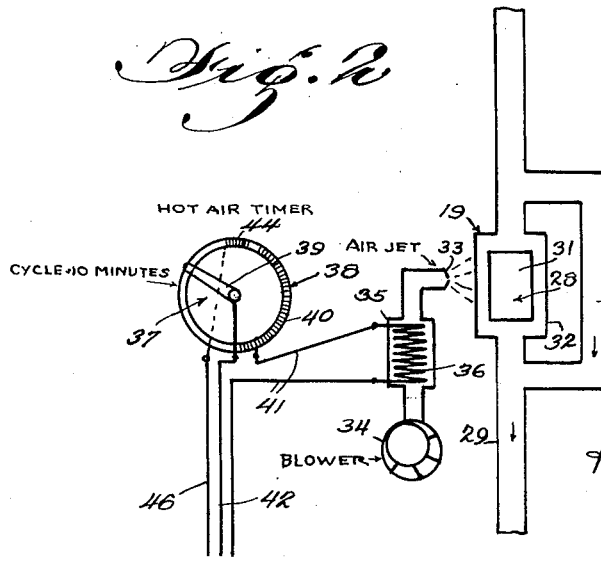
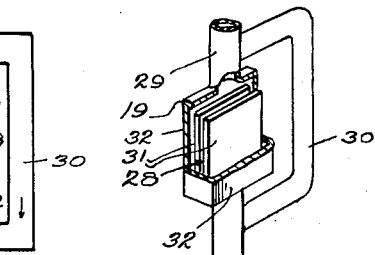
INVENTOR.
Karl A. Fischer
BY
W. J. Eccleston
ATTORNEY Patented Feb. 9, 1954

2,668,470

UNITED STATES PATENT OFFICE 2,668,470

METHOD AND APPARATUS FOR ELECTRO-OPTICAL ANALYSIS OF THE CRYSTALLINE CONTENT OF LIQUIDS

Karl A. Fischer, Washington, D. C.

Application May 13, 1948, Serial No. 26,909

7 Claims. (Cl. 88—14)

(Granted under Title 35, U. S. Code (1952), sec. 266)

The invention described herein, if patented, may be manufactured and used by or for the Government for governmental purposes without the payment to me of any royalty thereon.

This invention relates to a method and apparatus for determining by electro-optical analysis the percentage of crystal solids formed from or in liquids at reduced temperatures, and is more particularly directed to analytical determination of paraffin wax in mineral oils and wax cakes upon elimination of turbidity.

The usual method of determining the crystal solids content formed in a liquid body at reduced temperatures, particularly of paraffinic waxes in oils, requires as a first step the dilution of a weighed portion of the liquid with various solvents. This solution is then chilled to a proper temperature, filtered and either the residue or the filtrate weighed after removal of the solvent. In mineral oils particularly, the solubility of paraffin wax in oil and solvent even at low temperatures creates conditions which must be carefully met and the procedure is tedious and time-consuming. The present methods of such determinations are easily subject to error and not satisfactory for efficient plant control work where immediate results are desirable.

The hereinafter described method and apparatus for analytical determination of the crystallizable substance content for liquids, while applicable to analogous materials, is illustrated with reference to paraffin wax in mineral oil and wax cakes. This determination is based on the principle that paraffin waxes in their crystal form are doubly refracting and the proportionality of their double refractivity upon elimination of turbidity, caused by different crystal sizes, is electro-optically measurable affording an indication of paraffin precentages on a purely physical basis. However, to maintain uniform results in such measurement, the thickness of the waxy layer formed must not exceed the limit for which high paraffin percentages give a maximum light transmission through a multitude of tiny wax cystals arranged haphazardly so as to obtain mean optical activity. It is therefore apparent that, for testing continuously a series of samples, uniform proportionality of double refractivity can only be obtained by forming waxy layers having exactly defined thicknesses which do not exceed the limit which gives maximum transmission of polarized light for relative paraffin percentages. Further, taking into consideration that double refractivity is different for various crystalline waxes and different crystal size causes different turbidity, it is possible by the method and apparatus herein disclosed to plot for any particular waxy composition a curve, from standard preparations of a particular wax or wax containing material, which indicates in percentage the wax content of the samples. Unknown samples of a similar type wax can then be tested and the results determined from the standard graph. As heretofore stated, different paraffin waxes differ slightly in optical activity (see Fig. 5) and it is therefore preferable, in order to obtain more accurate percentages, to prepare graphs for different waxes in a manner as hereinafter described.

It is therefore an object of this invention to provide an accurate method of electro-optical analysis for determining the crystalline solids content which form at reduced temperatures in a liquid body.

It is another object of this invention to provide an electro-optical apparatus for determining the crystalline solids content which form at reduced temperatures in a liquid body.

Another object of this invention is to provide an electro-optical indicator arrangement which operates automatically to repetitiously indicate light transmitted through reproduced crystallized wax samples with transposition of the light value to determine and indicate paraffin percentage.

It is also an object of this invention to provide an apparatus which accurately reproduces with certainty a crystalline mass of exactly defined thickness with the crystals self-arranged to give mean optical activity.

Another object of this invention is to provide a method and means for reproducing a waxy layer which does not exceed the limit which for high paraffin percentages gives maximum transmission of light between crossed and parallel nicols.

It is a further object of this invention to provide a method for determination of the wax content in mineral oils and wax cakes by measurement of the quantity of light which passes through automatically and uniformly reprodced samples of a crystalline wax.

Another object of this invention is to provide an electro-optical apparatus for determination of the paraffin wax in mineral oils and wax cakes based on the mean optical activity of wax and wax oil mixtures.

An additional and further object of this invention is to provide a measurement of the optical activity of a crystallized wax or wax-oil mixture based on mean double refractivity with elimination of the turbidity variable primarily caused by non-uniform crystal size.

Other objects and advantages will be apparent from the following description of the accompanying drawings, wherein:

Figure 1 is a schematic illustration of an electro-optical indicating system;

Figure 2 is a diagrammatic illustration of crystal-forming means;

Figure 3 is a fragmentary perspective view of a crystallizing chamber partly broken away;

Figure 4:
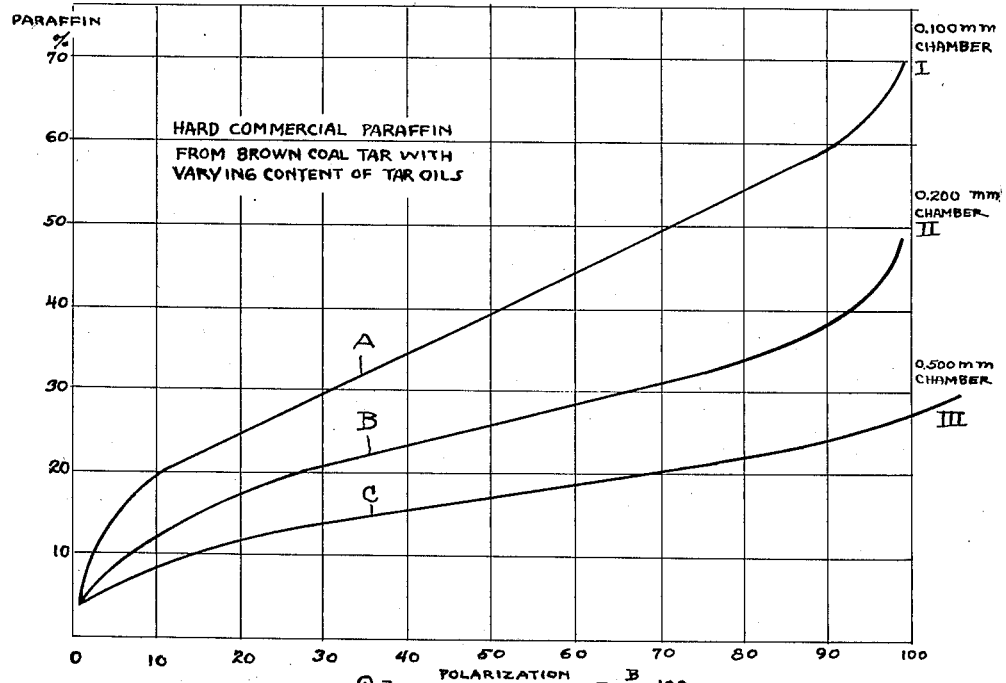
Figure 4 is an illustrative graph showing plotted quotients obtained by using wax samples of known percentages in different crystallized film thicknesses.

Referring to the drawings, a light source 10, which may be an incandescent lamp in the nature of a light bulb of low voltage, 30 watts, is controlled by rheostat 11 through conductor wiring 12 in the manner and for the purposes as hereinafter described.

The rays emitted by the light source 10 pass through a collector or parallel aligning lens 13, a water or cooling cell 14, aligning lens 15, ruby glass filter 16, diaphragm member 17 and polarizer 18. These light rays by passing through this arrangement are designed to have a large wave length for best penetrability through a turbid medium and by the use of the ruby filter disturbances which might be caused by fluorescence are eliminated. In the path of the polarized light beam, there is positioned a crystallizing unit 19 which is adapted to provide, for analysis, crystalline bodies of uniform thicknesses from a supply source (not shown).

The filtered and polarized light beam is illustrated as passing through a crystallized body contained in wax crystallizer 19 and thence into a pair of prisms 20 and 21. The prisms 20 and 21 split the light beams, passing a portion through a crossed nicol 22 and another portion through a parallel nicol 23 respectively. The light beam from crossed nicol 22 is then passed through a diverging lens 24 onto photovoltaic cell 25 and the beam from parallel nicol 23 is passed through a diverging lens 26 onto photovoltaic cell 27 for the purposes as hereinafter described.

In order to secure uniform light transmission characteristics, it is necessary to reproduce in crystallizer 19 solid bodies of exactly defined thickness. These solid bodies are formed by providing a crystal forming space 28 in the conduit or passageway 29. As heretofore stated the crystallizing space 28 is of a well defined size and is formed, for example, by placing a pair of flat transparent plates 31 exactly 0.100 mm. apart to secure certain desired results as herein set forth. These transparent plates 31 may be held by suitable cement or other holding means to the glass plates 32. Otherwise, the chamber 28 may be formed integrally with plates 32 for insertion as a complete unit into the conduit 29 in the manner as diagrammatically illustrated.

As an alternative, it has been found that a rectangular frame in the nature of a counting chamber for blood corpuscles may be inserted between the glass plates 32, in substitution of plates 31, and cemented therein with its top and bottom ends open so that molten paraffin can flow through the chamber. When paraffin crystals are formed fluid flow will be directed through bypass 30. The conduit 29 and bypass 30, with the exception of the glass plates 32, are insulated or heated as desired to maintain the paraffin melted and flowing.

In order to repetitiously and periodically form crystals in the space 28 an air jet 33, supplied by a conventional blower 34 through casing 35, provided with heating means 36, alternately ejects a flow of heating and cooling air against crystallizer 19. This air flow is synchronized with the transmission of light rays from source 10 by a timing switch 37. The switch 37 includes a circular bar 38 upon which contact brush 39 sweeps one full cycle in 10 minutes. The bar 38 has separate arcuate conducting segments or portions 40 and 44, as indicated, the remainder of the circular bar 38 being blank and non-conducting. The contact brush 39 intermittently and periodically actuates heater 36 through engagement with conducting segment 40 setting up a current flow through conductor wires 41 and 42 from a master relay 43. After contact brush 39 passes conducting segment 40, the heater is turned off for approximately seven minutes allowing a flow of cold air to pass through jet 33 to solidify and standardize for a proper time interval a paraffin sample in crystallizing chamber 28. Towards the end of the time interval that contact brush 39 sweeps through the cold air cycle, it engages conducting segment 44 causing a current to flow through conductor wire 42, transformer 45, a portion of conductor wire 41, and conductor wire 46 from master relay 43.

When the circuit is set up through contact of brush 39 with conducting segment 44 the master relay 43 causes a current to flow in conductor wires 47 to actuate reversible motor 48. The motor 48 through gearing 49 turns shaft 50 to move a contact slider 51 over rheostat 11. The moving of slider 51 closes the circuit through conductor wires 12 and 12', fed through transformer 45, energizes light source 10 with gradually increasing current until it reaches its maximum light emissive value. The gradual increase of current to lamp 10 by rheostat 11, or its equivalent, creates a light beam of constantly increasing radiance which is necessary to obtain a light transmission of constant intensity through crystallized masses for the approximate time interval of from the fifth to seventh minute after they are formed in crystallizing space 28. The time intervals described are correlated with the gradual increase of light intensity to produce a mean optical activity based on the mean double refractivity of a crystallized body, as wax or the like, for producing a record or an indication of such activity upon elimination or removal of the turbidity factor in the crystallized body.

The gradually transmitted light beam passing through parallel nicol 23 and diverging lens 26 causes photovoltaic cell 27 to set up a current through conductor wires 53 to actuate galvanometer relay 52. This galvanometer 52 is of conventional character having a scale division of 100 parts and its needle 54 is adapted to be moved to a maximum point by the transmitted light beam. When needle 54 has reached its maximum swing it hits a contact setting up a current in conduit wiring 55 and 56 and causes master relay 43 to actuate automatic recorder 57 at the proper time. This recorder may be a depressor bar millivoltmeter, microammeter, milliammeter, or the like of conventional character.

During the actuation of galvanometer needle 54 the light beam transmitted through the crossed nicol 22 and diverging lens 24 causes a current to be set up by photovoltaic cell 25 which is carried by conductor wiring 58 to recorder 57 causing a stylus 59 to move or adjust and position itself over recording sheet 59'.

When the light beam passing through crossed nicol 22 and parallel nicol 23 has reached its maximum value and the pointer 54 on galvanometer relay 52 has made its contact setting up a current through conductor wiring 55 and 56 the master relay 43 actuates the stylus 59, by setting up a current in conductor wiring 60 and 61, to produce a marking on a recording sheet 59' in recorder 57 in a conventional manner. Upon movement of stylus 59 to mark recorder sheet 59' it activates a relay in master relay 43 to reverse the current in motor 48 which causes slider 51 through the reverse motion of gearing 49 and shaft 50 to move back on rheostat 11 to zero position, shutting off the current to light source 10. As the power of the light beam is reduced and cut off, pointer 54 on galvanometer relay 52 swings back to make contact with conductor wire 62 thereby producing a current in conductor wiring 56 and 62 which causes a resetting of master relay 43. By continued operation of timer 37 the heating unit 36 is again energized, new wax enters the crystallizing space 28 and is solidified with operation of the electro-optical assembly again set in motion at the end of the cooling period in the manner as above described.

The graph disclosed in Figure 4, was made from standard preparations of commercial paraffin derived from brown coal tar blended with different percentages of tar oils using different crystallizing spaces of 0.500 millimeter, 0.200 millimeter and 0.100 millimeter. As illustrated by curve A, crystallized film thicknesses of 0.100 mm. when plotted on the basis of known paraffin percentages against quotients derived from the value of the transmission of polarized light through a crossed nicol over its transmission through a parallel nicol times 100 gives the standard for maximum light transmission which passes the preparation in reference to the maximum light quantity which could pass the paraffin layer if the optical activity was 100 percent.

The curves B and C of Figure 4 represent plotted values obtained in the manner above indicated using crystalline film thicknesses of 0.200 mm. and 0.500 mm. respectively. From these curves it will be observed that the 0.100 mm. crystallized film thickness produces a straight line for wax percentages substantially in the range of from approximately 25 to 65 percent. Whereas curves B and C are formed from thicker crystallized bodies with lower wax percentages and equivalent quotients, calculated as above indicated, to produce straight lines substantially in the range of compositions containing from 15 to 35 percent and from 5 to 25 percent respectively.

As illustrated the curves A and B run relatively steep for low wax percentages and extremely steep for high wax percentages. Consequently, when utilizing a crystallizing chamber, in the nature of that with which curve A is secured, higher percentage waxes may be diluted with known quantities of wax free oil and for lower percentage wax content materials thicker layers are desirable. Generally, it can be stated, that thick crystallized films are to be avoided as they prevent high percentage readings due to the influence of turbidity which is detrimental to the proportionality of double refractivity to wax content.

The solidification temperature for ordinary runs will be approximately 20° C. and the solubility of wax in oil is negligible, however, for low wax percentage compositions this solubility factor becomes important for accurate determination and it becomes necessary to chill the crystallizing chamber by super cooling the air flow in a conventional manner as refrigeration or the like, to lower temperatures. The respective melting points and crystallizing temperatures for the particular waxes or other crystalline material are generally known or are a matter of laboratory determination by conventional procedure. Further care should be taken to avoid crystallization of water or other materials which are also doubly refracting with the sample undergoing testing to prevent error in the light transmission reading.

Figure 5:
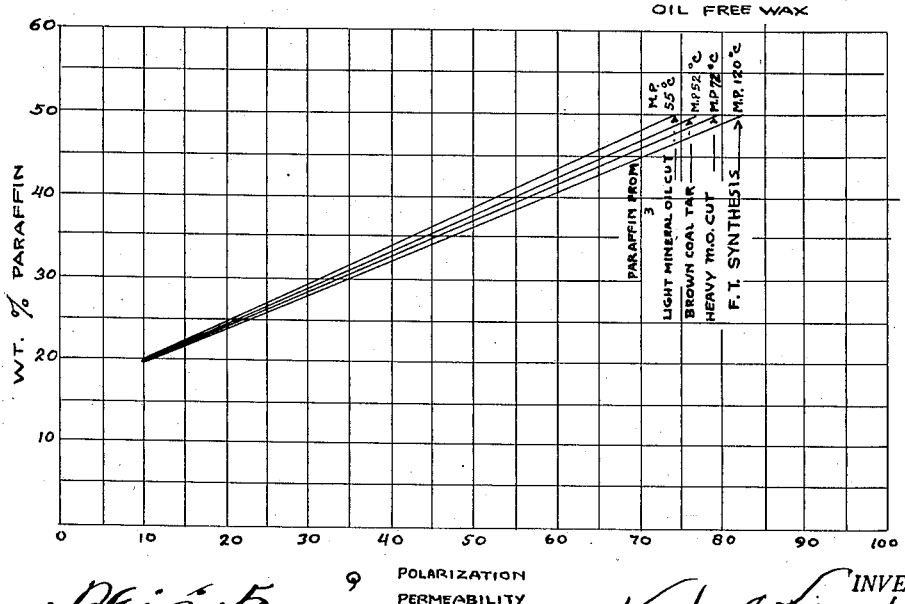
Figure 5 is a graph illustrating different optical activities of various paraffin-oil systems.

As heretofore indicated, there are slight differences in the optical activity or natural differences in the double refractivity of different paraffins thereby producing different quotient values for compositions containing the same paraffinic percentage, as shown by Fig. 5. From this graph it will be obvious that paraffin from light mineral oil having a melting point at 55° C. shows a quotient factor of 75, whereas paraffin from brown coal tar having a melting point at 52° C. has a quotient factor of 77.5. Other paraffins will produce different quotient values as shown by the graph and accordingly it is advantageous to know this value, for the specific type paraffin being tested when running tests for unknown paraffinic percentages. That is, for reliable results in light transmission values, it is essential to know the correct optical activity of the material undergoing testing. Such values, may be obtained by producing some oil free paraffin from the concerned product, purifying it in any conventional manner, than running light transmission tests of known percentages and thereafter plotting the quotient values. These values are then available for interpretation of unknown paraffin percentages containing similar or like paraffin.

In utilizing the apparatus disclosed herein for accurately producing with certainty samples of exactly defined thickness to obtain a reliable and correctly measurable optical activity, based on double refractivity with the influence of turbidity eliminated, it is necessary to first correlate the recording instrument 57 with galvanometer relay 52. That is, the relative movement of stylus 59 is adjusted to the deflection pointer 54 on the 100 scale division of galvanometer 52. This correlation is obtained by sending the polarized light through a preliminary sample or repeatedly through a plurality of samples with nicol 22 arranged in a parallel position. With both nicols 22 and 23 parallel, light intensity is gradually increased, by movement of the rheostat 11 in the manner as heretofore described, to adjust the deflection of pointer 54 exactly equivalent to the 100 scale part deflection of stylus 59. Having thus set up through parallel nicols the standard for light penetration through a paraffin sample proportional to its turbidity, nicol 22 is replaced in the cross position to pass a light quantity therethrough which is proportional to the paraffin content of the sample.

Thereafter the apparatus operates to reproduce as often as desired a crystallized body in the chamber 28 and the light operating and recording mechanism functions in the manner as described. The record sheet may be set up, as illustrated, to record wax percentages in proportion to the light transmitted and indicated by operation of stylus 59. On the other hand, the imprint made by stylus 59 may be recorded as the value of light transmission only and such value interpreted from table or graphs prepared from known samples of equivalent character.

From the above disclosure it will be recognized that there is provided a paraffin recorder for plant control work or crystalline wax analysis which gives readings within the limits of experimental error that are linearly proportional to percentages, which may be expressed in paraffin percentage, quotient or other values, within the limits of substantially 25%–65% when using a paraffin crystallizing chamber of 0.100 mm. thickness. More paraffinic samples may be diluted with oil or a thinner crystallized layer may be formed by providing a more narrow crystallizing chamber, for example, of 0.0500 mm. cross-sectional open area. Further, that non-linear relationship of light transmission for high paraffinic concentrations of standard thickness may be recorded and the instrument calibrated accordingly, or interpretations made from its readings.

Having thus described my invention it will be apparent that the unit is adaptable to advantageous uses and applications not illustrated but for which it is readily applicable by minor changes in its construction and installation which come within the scope of the appended claims.

I claim:

1. A method of measuring the crystalline content of a liquid comprising forming a mass of the liquid and freezing the mass to solidify it, transmitting a beam of light through the solidified mass while gradually increasing the intensity of the light beam, dividing the light beam after it has passed through the solidified mass, and directing the divided light beam upon separate light sensitive devices to energize electrical recording means.

2. A method of measuring the crystalline content of a liquid comprising forming an exactly defined thin mass of the liquid, subjecting the thin liquid mass to a cold air blast to crystallize the mass, directing light through the thin crystallized mass while gradually increasing the intensity of the light, dividing the light into separate light beams after it is transmitted through said crystallized mass, directing the separate light beams upon separate light sensitive devices, and operating electrical recording means from the light sensitive devices.

3. A method of measuring the crystalline content of a liquid comprising forming a mass of the liquid and freezing the mass to solidify it, transmitting a beam of light through the solidified mass while gradually increasing the intensity of the light beam, dividing the light beam after it has passed through the solidified mass and directing the divided light beam upon separate light sensitive devices to energize electrical recording means, and then melting the solidified mass preparatory to the formation of a new liquid mass.

4. A method of measuring the crystalline content of a liquid comprising forming an exactly defined thin mass of the liquid, subjecting the thin liquid mass to a cold air blast to crystallize the mass, directing light through the thin crystallized mass while gradually increasing the intensity of the light, dividing the light into separate light beams after it is transmitted through said crystallized mass, and recording the crystalline content of the liquid through the effect of the separate light beams upon separate photoelectric devices at the instant of maximum light transmission through said crystallized mass.

5. A method of measuring the crystalline content of a liquid comprising forming an exactly defined thin mass of the liquid, subjecting the thin liquid mass to a cold air blast for a fixed period of time to crystallize the mass, directing light through the thin crystallized mass while the mass is still subject to the cold air blast and simultaneously gradually increasing the intensity of the light, dividing the light into separate light beams after transmission of the light through said crystallized mass, directing the separate light beams upon separate light sensitive devices, recording the crystalline content of the liquid through the effect of the separate light beams upon the separate light sensitive devices, and then subjecting the crystallized mass to a hot air blast to melt the mass preparatory to the formation of a new liquid mass.

6. Apparatus for indicating the crystalline content of a liquid comprising a specimen container including flat closely spaced transparent sides forming an exactly defined thin specimen chamber, conduit mean to convey a quantity of the liquid to the specimen chamber, a blower arranged near said specimen container for subjecting it to a cold air blast and thereby freezing the specimen within the specimen chamber, a source of light arranged upon one side of the thin specimen chamber for directing light through the frozen specimen within the chamber, the light passing normal to said flat sides of the specimen container, prism means arranged upon the other side of the specimen container for dividing the light into separate light beams after its transmission through the specimen container, separate light sensitive means receiving the separate beams of light from the prism means and adapted to actuate electrical recording means for indicating the crystalline content of the liquid, and time controlled means for gradually increasing the intensity of the light until maximum light transmission through said specimen container takes place.

7. Apparatus for measuring the crystalline content of a liquid comprising a specimen container having flat substantially parallel transparent sides arranged in spaced relation to form an exactly defined thin specimen chamber, conduit means for conveying the liquid to and from the specimen chamber, a blower arranged near the specimen container for directing a cold air blast upon the same and solidifying the specimen, a source of light arranged upon one side of the specimen container, lens and filter means arranged between the source of light and specimen chamber for directing the light through the specimen chamber normal to the flat parallel sides of the same, prisms arranged upon the other side of the specimen container and receiving the light after its transmission through the specimen and dividing the light into separate light beams, separate photoelectric devices receiving the separate light beams and adapted to operate recording means, a heating element connected with the blower for allowing the blower to direct a hot air blast upon the specimen container to melt the specimen, a rheostat connected with the source of light to gradually increase the intensity of the light while the blower maintains the specimen solidified, and an electrical timing device for operating the rheostat blower and heating element.

KARL A. FISCHER.

(References on following page)

References Cited in the file of this patent

UNITED STATES PATENTS

| Number | Name | Date |
|---|---|---|
| 1,594,264 | Howard | July 27, 1926 |
| 1,793,672 | Bridgman | Feb. 24, 1931 |
| 1,922,283 | Dering | Aug. 15, 1933 |
| 1,960,615 | Baker | May 29, 1934 |
| 1,977,359 | Styer | Oct. 16, 1934 |
| 2,019,871 | Pettingill et al. | Nov. 5, 1935 |
| 2,063,140 | Allison | Dec. 8, 1936 |
| 2,149,076 | Stockbarger | Feb. 28, 1939 |
| 2,167,484 | Berry | July 25, 1939 |
| 2,277,421 | Suits et al. | Mar. 24, 1942 |
| 2,296,992 | Warmisham et al. | Oct. 13, 1942 |
| 2,323,876 | Pickett | July 6, 1943 |
| 2,374,762 | McNitt | May 1, 1945 |
| 2,441,049 | West | May 4, 1948 |

FOREIGN PATENTS

| Number | Country | Date |
|---|---|---|
| 82,523 | Germany | June 29, 1894 |